United States Patent [19]
Groeger et al.

[11] Patent Number: 5,486,410
[45] Date of Patent: Jan. 23, 1996

[54] FIBROUS STRUCTURES CONTAINING IMMOBILIZED PARTICULATE MATTER

[75] Inventors: H. Gunter Groeger; George A. Serad; Clinton D. Felton, all of Charlotte, N.C.

[73] Assignee: Hoechst Celanese Corporation, Somerville, N.J.

[21] Appl. No.: 245,103

[22] Filed: May 17, 1994

Related U.S. Application Data

[63] Continuation of Ser. No. 977,995, Nov. 18, 1992, abandoned.

[51] Int. Cl.⁶ ........................................... B32B 5/16
[52] U.S. Cl. ..................... 428/283; 428/296; 428/297; 428/408; 428/331
[58] Field of Search ...................... 428/198, 331, 428/323, 283, 296, 297, 903, 408, 320, 372, 373, 374

[56] References Cited

U.S. PATENT DOCUMENTS

| | | | |
|---|---|---|---|
| 3,971,373 | 7/1976 | Braun | 428/328 |
| 3,998,988 | 12/1976 | Shimomai et al. | 428/400 |
| 4,429,001 | 1/1984 | Kolpin | 428/383 |
| 4,554,198 | 11/1985 | von Blucher et al. | 428/143 |
| 4,565,727 | 1/1986 | Giglia et al. | |
| 4,681,801 | 7/1987 | Eian et al. | |
| 4,795,668 | 1/1989 | Krueger et al. | |
| 4,868,032 | 9/1989 | Eian et al. | |
| 4,872,220 | 10/1989 | Haruvy et al. | 2/243 |
| 4,904,343 | 2/1990 | Gigilia et al. | 162/145 |
| 4,950,541 | 8/1990 | Tabor et al. | 428/373 |
| 4,966,809 | 10/1990 | Tanaka et al. | 428/323 |
| 4,970,111 | 11/1990 | Smith, Jr. | 428/283 |
| 5,077,116 | 12/1991 | Lefkowitz | 428/141 |
| 5,082,720 | 1/1992 | Hayes | 428/224 |
| 5,328,758 | 7/1994 | Markell et al. | 428/903 |

FOREIGN PATENT DOCUMENTS

| | | |
|---|---|---|
| 275047 | 7/1988 | European Pat. Off. . |
| 5131136 | 5/1993 | Japan . |

*Primary Examiner*—N. Edwards
*Attorney, Agent, or Firm*—Philip P. McCann

[57] ABSTRACT

A fibrous structure comprising a composite fiber matrix loaded with immobilized functional particulate and including void spaces forming tortuous flow paths, is provided. The particulate is beneficially distributed in the interior of the fibrous structure in three dimensions and fused to a low melting component of the composite fibers without substantially reducing the available surface area of the particulate. A filtration structure of a composite staple having a nylon sheath and a polyester core, with activated carbon particles bonded to the fiber matrix, and including a microfiber web located within the structure, is specifically disclosed.

12 Claims, 2 Drawing Sheets

5,486,410

FIBROUS STRUCTURES CONTAINING IMMOBILIZED PARTICULATE MATTER

This application is a continuation of Ser. No. 07/977,995 filed on Nov. 18, 1992, now abandoned.

FIELD OF THE INVENTION

This invention relates to a fibrous structure containing functional particulate matter.

BACKGROUND OF THE INVENTION

Functional particulate matter may be incorporated into a fibrous structure for a variety of reasons. For example, chemical defense fabrics for military personnel may contain vapor sorptive particles such as activated carbon. These fabrics typically are designed to remove poisonous gases from the air. Filter media or filters may include sorptive particles for selectively removing certain components of a liquid or gas passing through the filter. Abrasive particles may be used to create an abrasive fabric. Functional particulate matter may also be used to release an active or desirable agent into a fluid stream, and may be chemically or catalytically reactive with a fluid stream constituent.

Fibrous structures containing solid particulate matter are known, as illustrated by U.S. Pat. Nos. 3,971,373 to Braun, 4,429,001 to Kolpin et al, 4,795,668 to Krueger et al, 4,868,032 to Eian et al, 5,082,720 to Hayes, 5,077,116 to Lefkowitz, 4,872,220 to Haruvy et al, 4,904,343 to Giglia et al, and 3,998,988 to Shimomai et al, and as further illustrated by European Patent Application Nos. 275,047, published on Jul. 20, 1988, and 93-208373. Braun describes physically forming a three dimensional arrangement of particles in a melt blown web. Kolpin et al describe sorbent particulate physically held in place.

Krueger et al teach molding a shaped filtration structure from a bicomponent fiber-blown web. The nonwoven web is preferably formed from microfibers, and may include particles bonded to the fibers, to provide enhanced mechanical filtration. The filtration structure may include other layers. Eian et al describe a melt blown web containing a three dimensional arrangement of particles. The web is formed from unicomponent fiber and includes transversely extending reinforcing, bicomponent fiber. Eian et al teach the advantage of a crimping action during melt bonding. Hayes avoids bicomponent fibers having latent crimpability, in forming the abrasive webs thereof.

Lefkowitz describes a forming fabric to which may be adhered a non-woven web, or which may include particles bridging across fabric interstices, for fines retention. European 93-208,373 describes a bicomponent fiber web containing active carbon particles adhered to the fiber.

One problem that has been encountered is that garments containing particulate matter typically do not last for a suitable period of time. Washing and other stresses can result in delamination of the fabric layers, loss of particulate matter, and other deterioration. Adherence of particulate matter to the surfaces of a web may interfere with bonding between layers. Also, particles adhered to web surfaces, are subject to abrasive removal.

Accordingly, despite the foregoing advances, an improved fibrous structure containing a three dimensional arrangement of functional particulate, is needed. It is desirable for particulate to be immobilized without deleterious reduction in particulate surface area. It is desirable for the web structure to be capable of high loading with particulate. It is desirable for the particulate to be located so as not to interfere with bonding between layers or be subject to abrasive loss. Furthermore, it is desirable for the size of void spaces to be controllable.

SUMMARY OF THE INVENTION

In accordance with the present invention, an improved fibrous structure is advantageously based upon a composite fiber matrix. In this regard, this invention is based upon the discovery that a thermally bondable, fibrous web may be used to provide immobilized functional particulate matter, and furthermore that benefit results when the fibrous structure includes a microfiber web.

Advantageously, composite fiber providing the immobilizing matrix, includes a structure-forming component and a heat-bondable, polymeric component. The immobilizing matrix or web is open for entrapment of functional particulate matter. Beneficially, the web is generally uniform, and the functional particulate matter is distributed in three dimensions within the web without substantially extending into the upper and lower surfaces. The particles are advantageously entrapped in interstices of the web structure, which is thermally bonded at the cross over points of individual fibers. In this way, migration of the particles out of the web may be substantially precluded. Additionally, the thermally-bondable, polymeric component of the web structure advantageously provides for fusion of the particles to the matrix structure to further secure the particles without substantially deleteriously affecting surface area of the particles.

The fibrous structure beneficially may further include a microfiber web in contact with the thermally bonded, particulate-immobilizing matrix. In an important application of the fibrous structure, a high efficiency filter media useful for removal of pollen and other difficult to remove air pollutants and having an improved flow rate, results.

According to the present invention, the size of void spaces of fibrous structures may be controlled for minimum pressure drop of air or liquid flow through the structure. For instance, filtration structures may be customized to a desired efficiency by using the microfiber web to control pore size.

BRIEF DESCRIPTION OF THE DRAWING

Reference is now made to the accompanying drawing, which forms a part of the specification of the present invention.

Figure 1:
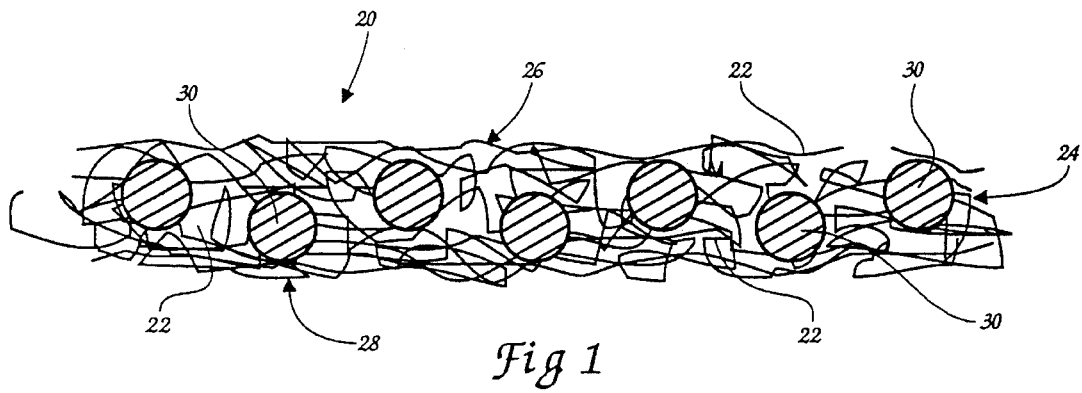
FIG. 1 is a sectional view depicting a fibrous structure having functional particulate matter immobilized within, in accordance with the invention.

It will be understood that certain of the foregoing Figures are highly illustrative and simplified.

DETAILED DESCRIPTION OF THE INVENTION

As indicated above, the improved fibrous structure of the present invention is advantageously based upon a particulate-immobilizing, fibrous matrix formed from composite fiber including a structure-forming component and a thermally-bondable, polymeric component. Beneficially, the structure-forming component provides high structural integrity even when highly loaded with functional particulate, and the thermally-bondable component has high bonding capability for fusion bonding of the particulate to the fibrous matrix. Advantageously, the composite fiber lacks latent crimpability characteristics which may tend to produce a distorted, non-uniform web structure upon thermal bonding.

Polyesters are particularly useful as the web structure-forming component of a suitable composite, polymeric fiber. However, other web structure-forming, thermoplastic polymers or materials melting at a substantially higher temperature than the heat-bondable component of the composite fiber, may be used. Generally speaking, the web structure-forming component melts at a temperature preferably at least about 30° to 50° C. higher than the heat-bondable component.

Also forming a useful composite fiber is a thermally-bondable, polymeric component. This component provides a self-bonded, structural matrix upon appropriate treatment of the composite fibers. Advantageously, this component is selected to optimize fusion bonding of functional particulate matter to the web structure.

Competing considerations govern suitability of the temperature at which the heat-bondable component melts. A relatively higher temperature requires relatively more energy for melting and requires a relatively higher melting web structure-forming component. Too low a temperature may result in product degradation or destabilization during use. In any event, the melt temperature should generally not be so high as to degrade or otherwise negatively affect the structural network or functional particulate matter. For a polyester web structure-forming component, the melt temperature of the heat-bondable component will typically beneficially range from about 130° to 200° C., for fiber-to-fiber and fiber-to-particulate bonding.

Beneficially, a suitable heat-bondable component of a useful composite fiber has a defined melting point for fiber-to-particulate bonding. By comparison, polymeric materials having a wide melting range in excess of about thirty degrees centigrade, would generally not be useful. Accordingly, generally speaking, the narrower the melting point, the more suitable a heat-bondable component will be for the purposes of the present invention, whereas the wider the melting point or range, the less suitable a heat-bondable component will be. Illustrative thermoplastic polymers having a sharp melting point include polyamides and polyesters, in particular homopolymers. A benefit of a sharp or defined melting point of preferably less than about twenty degrees centigrade, very preferably less than about twelve degrees centigrade, is that fiber-to-fiber bonding and particulate-to-fiber bonding tend to be highly controllable. In determining whether a polymeric material has a sharp melting point for the purposes of the present invention, the melting point should generally be considered to begin when the material becomes soft and tacky and to end when the material is totally liquid.

Many polymers, including olefins such as polyethylene and polypropylene, modified polymers, block polymers, and copolymers, have a wide melting range of about 30° to 60° C. or more, and therefore may be difficult to use for fusion bonding particulate matter to a fibrous matrix. Such polymers are not beneficially useful apparently due to lack of adequate controllability of the melt and freeze cycle.

Moreover, a suitable heat-bondable component of a useful composite fiber beneficially has adequate melt flow for strong bonding, in particular strong physical bonding, at elevated temperatures above its melting point, and yet has melt viscosity sufficient to preclude dripping or undesirable coating of functional particulate. Thus, a suitable heat-bondable component may preferably have a relative viscosity of from about 0.8 to 1.6, very preferably of from about 0.9 to 1.2, as measured in m-cresol.

Particularly beneficial, thermally-bondable components of a useful composite fiber include thermoplastic polymers such as polyamides. An exemplary polyamide is nylon-12, which melts over an about ten degrees centigrade range and hence has a sharp melting point for purposes of the present invention. Other nylons useful with a structure-forming fiber component having a melting point in the range of from about 250° to 260° C., include nylon-11; a drawback of nylon-6 as a thermally-bondable component, is a high melting point of about 220° C. As one skilled in the art will recognize, a suitable thermally bondable component is not limited to polyamides. To the contrary, any other polymeric material may be selected that meets the foregoing requirements. Thus, any other polymeric material having a sharp melting point, having a significantly lower melting point than the web structure-forming component, and otherwise processable, for instance, beneficially melt spinnable and drawable, may be used.

Concentric sheath-core fibers are one example of composite fibers useful in the practice of the invention. Suitable composite fibers also include eccentric sheath-core fibers, and fibers having a side-by-side configuration. Composite fibers of these types are known as bicomponent or heterofil fibers.

The skilled artisan will recognize that a variety of composite fibers exist or may be made having a lower melting component as described, and that are suitable for the practice of the invention, and that a nylon/polyester composite fiber is merely illustrative. Advantageously, a spun, heterofil fiber is used.

The composite fibers may be in a wide variety of forms including crimped and non-crimped cut staple fibers, short-cut staple, continuous filaments, and blends thereof. Advantageously, a non-woven web structure in accordance with the invention, may be formed from crimped composite fibers so as to be somewhat lofty for enhancing entrapment of functional particles. The composite fibers should be present in an amount sufficient to form a three dimensional structure that entraps functional particles and that provides fusion bonding of the particles to the web structure. The structure is beneficially generally uniform to assist in three dimensional distribution and spacing of the particles. Binding of particles to the fibrous matrix at more than one point, thereby minimizing particle migration, may be beneficially provided. However, generally speaking, it is advantageous for the particulate-immobilizing matrix to be present in a minor amount compared to the amount of functional particulate matter. Accordingly, although a fibrous web including immobilized particulate matter may in accordance with the invention include from about 10% to about 50% by weight of composite fiber, it is generally preferable that only about 10–25 wt % of a particulate-loaded web, be fiber. Thus, the structure-forming fiber component beneficially provides high structural integrity so as to make possible a high loading of particulate.

Useful composite fiber is typically macrofiber having an average diameter in excess of about 10 microns. A typical average diameter may be about 12 to 25 microns depending upon the intended application. For dry lay processing, the fiber has a length to diameter ratio that is limited on the low side. A typical range will be between about 3000 to 4000:1, with about 3000:1 usually being a lower limit. On the high side, continuous length fiber may be used.

For wet lay processing, useful composite fiber has a length to diameter ratio that is limited on the upper side, because wet laying becomes more difficult as the ratio becomes relatively higher. A preferred ratio is about 1500 to 2000:1, with average fiber diameter ranging from in excess of 10 microns to about 3000 microns. For an average diameter of about 15 microns, a preferred length is about 2 to 20 mm for short cut fiber. Depending upon the intended use, coarse fiber of about 2000 to 3000 microns average diameter may be used, with short cut fiber of this type typically having a length of several inches.

Composite fibers of different diameters may be used. In addition, the immobilizing matrix may include non-composite fibers, filament or staple, or other substances such as cellulose acetate fibrets. A fabric structure including the immobilizing matrix, may include microdenier fibers of from 0.1 to 1 denier per filament to provide softness for comfort in a garment. Immobilizing matrices intended for use in filters, may advantageously include structural fibers having a denier per filament of from 6 to 10,000 to provide stiffness, especially if large particulate is used, and also may advantageously include microdenier fibers for effective filtration of smaller particulate. These microdenier fibers or stiffening fibers may be composite or non-composite fibers, or a blend thereof. Fibrous structures including functional particulate, can be built to thicknesses of from 0.5 to 50 mm or more.

Functional particulate matter may be selected from a wide variety of substances having a function that is desirably incorporated into a fibrous structure. The particulate may be in the form of beads, granules and so forth. Illustrative is activated carbon adsorbent for, for instance, removal of undesirable or hazardous gas. Activated carbon beads or other functional solid particulate may be fused to individual fibers of the fibrous structure by heating the particles above the melting point of the low melting component of the composite fiber and dispersing the particles into the composite fiber-based web, or by heating the web after the particles have been dispersed therein. Beneficially, the functional particulate has a significantly lower specific heat than the lower melting fiber component and so heats quickly to produce localized fluidity of the lower melting fiber component. A "spot weld" is produced with a thin, controlled layer of adhesive provided by the thermally-bondable fiber component that minimizes loss of surface area of the particle. Activated carbon particles and inorganic oxides and hydrates are characterized by significantly lower specific heat.

Other types of functional particulate matter include silica, zeolite, molecular sieve, clay, alumina, sodium bicarbonate, ion exchange resin, catalytic agents including enzymatic agents, metal oxide, and biocidal, fungicidal, virucidal, air-freshening and perfuming particulate. Fungicidal particulate matter may be incorporated into a filter structure, such as for an automobile climate control system, to remove mildew and mildew odors from circulated air. Biocides and virucides may be incorporated into chemical defense fabrics for protection against biological warfare. The foregoing list is intended to be representative of the wide variety of functional particulate matter available, and not in limitation of the substances suitable for use in the practice of the present invention.

Functional particulate matter may range in size from about 1 micron for biocides and fungicides to about 3 to 5 mm in average diameter, and may vary in shape from regularly shaped, spheroidal beads and cylinders to irregularly shaped particles. However, generally speaking, the particulate matter beneficially has an appropriate size to be entrapped by the web structure. Activated carbon particles of about 400 to 500 microns are highly suitable for entrapment in a dry-formed web made from fibers having an average diameter of about 15 microns. Functional particulate too small to be entrapped, may be beneficially preheated and dispersed into the fibrous matrix for fusion bonding upon contact with matrix fibers. Additionally, reduction of size of void spaces generally results from the addition of functional particulate; accordingly, smaller size, functional particulate that would not be otherwise entrapped, may be entrapped by first adding functional particulate of appropriate size to be entrapped and thereafter added the smaller size, functional particulate.

Beneficially, the macrostructure network may be loaded with about 50%–90% by weight of functional particulate, preferably about 75%–90% by weight, based on the combined weight of the functional particulate and of macrofiber forming the composite matrix. General uniformity of the structural matrix and use of composite fiber in accordance with the invention, advantageously provide high structural integrity and make possible a high loading of functional particulate. Generally speaking, the higher the loading of the functional particulate so as to provide for tortuous flow paths, yet with adequate void space providing for minimum pressure drop, the better a fibrous structure in accordance with the present invention.

As described, a fibrous structure in accordance with the present invention, is advantageously based upon a self-bonded, functional particulate-immobilizing, composite fiber matrix. Particulate immobilization substantially limits migration of particulate matter within the structure and abrasive loss of particles. In filtration applications, this structure is effective in removing particulates of about 3 microns and larger. This benefit results because, as previously mentioned, functional particulate advantageously reduces the size of void spaces within the composite fiber matrix. Moreover, functional particulate loading may produce tortuous flow paths. Accordingly, the composite fiber functions not only to form the structural matrix and to entrap functional particulate and fusion bond functional particulate to the structural matrix, but together with the immobilized particulate also may function to remove undesired particulates from a fluid or gas stream. Thus, a composite fiber matrix loaded with about 50–90, very preferably about 80–90, percent by weight of noxious gas-absorbing particulate, is suitable for both vapor absorption and particulate filtration.

Moreover, a fibrous structure in accordance with the present invention, further beneficially may include a suitable microfiber web. Advantageously, the microfiber web defines flow passageways generally of smaller size than the flow passageways in the functional particulate-loaded, macrofiber matrix, and is thus characterized by finer interstices or voids. Average pore size of the microfiber web may be adjusted by varying the level or diameter of microfiber. Thus, the microfiber web may be used to further customize the porosity of the fibrous structure. If desired, the microfiber web may be of appropriate porosity for fine particulate filtration. By the term "fine particulate filtration" is meant the effective removal of particulate of about 3 microns and less.

Generally speaking, a microfiber web requires a support structure. Typically, in the prior art, a microfiber web is therefore sandwiched between protective fabric layers. Advantageously, by the present invention, the microfiber web is merely disposed within the fibrous structure. Thus, a fibrous structure formed from the particulate-immobilizing, composite fiber matrix and the microfiber web avoids the need for additional protective layers and therefore has decreased pressure drop than would otherwise result. Moreover, the foregoing combination requires less microfiber to achieve the same filtration result than would be required by a microfiber web conventionally sandwiched between protective layers.

The microfiber may, generally speaking, be any fiber of small diameter, typically less than 10 microns average diameter. It may be, for example, a polymeric microfiber or a mineral microfiber, or a mixture of types of microfiber. Microfiber of relatively smaller diameter may be particularly beneficial for filtration applications. Accordingly, particularly suitable microfiber for a filtration structure in accordance with the present invention, has an average diameter of about 5 microns or less, preferably about 1 to 3 microns. Highly preferred microfiber has an average diameter of about 1 to 2 microns. Microfibers of different diameters may be combined.

Exemplary polymeric, unicomponent microfiber includes polyester such a polybutylene terephthalate. Generally speaking, polymeric microfiber will advantageously melt at a temperature substantially in excess of the thermal bonding temperature to be used. The microfiber may be a functional fiber having, for instance, a vapor sorptive function. A carbon/polymeric microfiber blend or other suitable functional blend may be used.

Beneficially, melt blown, polymeric microfiber may be used. The average fiber in a typical melt blown, microfiber mixture has a diameter of about 1 to 2 microns. An average diameter of about 0.5 micron is, generally speaking, a lower practical limit of melt blown microfiber with current technology.

Suitability of a particular microfiber diameter and length depends in part upon the end use intended for the fibrous structure. For filtration applications, the permeability selected for the microfiber web will vary depending on the intended application. Generally, high filtration efficiency with minimal pressure drop is desired. Typically, air permeability ranging from about 80 to 250 cu.ft. per minute per sq. ft. of the microfiber web, will be suitable, with permeability in the range of about 150 to 200 being preferred. When quantified in terms of bubble point, permeability of about 5 to 15 inches of water pressure is suitable, with about 8 to 12 inches being preferred.

The microfiber may be in a wide variety of forms. Crimped microfiber may beneficially form a loftier structure for enhanced porosity for a given filter efficiency.

For practical purposes, for filtration applications, the least amount of the microfiber web will generally be used as is consistent with obtaining the desired filtration efficiency. To this end, a microfiber web providing about 5 to 40% of the total fiber weight, is generally useful depending upon the particular application. Preferably, the microfiber web provides about 10 to 25% of the total fiber weight.

Thus, it may be understood that a fibrous structure in accordance with the present invention, advantageously includes a composite fiber-based structure that uses macrofiber for forming interstices of appropriate size for capture and support of functional particulate matter and spot welding of captured particulate to the particulate-immobilizing matrix, and may include a microfiber web for pore size control, for removal in filtration applications of undesired fine particulate. Typically, therefore, in filtration applications, the microfiber web is free of functional particulate matter.

FIG. 1 shows at 20 a sectional view through an open, non-woven, fibrous structure in accordance with the invention. The structure is advantageously dry formed from crimped fiber, which is beneficially spun, heterofil macrofiber. To this end, a plurality of individual composite fibers 22 form an open web 24, and define an upper surface 26 and a lower surface 28 of the web. Beneficially, the web is appropriately open and generally uniform in structure so that particles 30 are distributed in three dimensions and entrapped within the web, and particles 30 are distributed and spaced without substantially extending into the upper and lower surfaces of the web. Particles 30 are advantageously entrapped in interstices of the web structure, which is thermally bonded at the cross over points of individual fibers 22. In this way, migration of the particles out of the web may be substantially precluded. Additionally, particles 30 are advantageously fused to individual structural fibers to further secure the particles.

Figure 2:
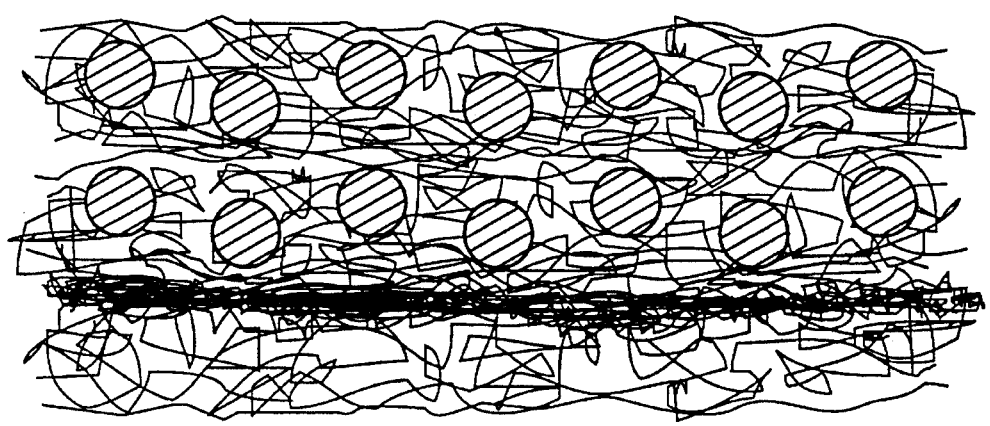
FIG. 2 is a sectional view illustrating a layered fibrous structure in accordance with the invention, which includes a non-woven web having functional particulate matter immobilized within, and a microfiber web disposed within the fibrous structure.

With reference to FIG. 2, a fibrous structure 32 in accordance with the present invention, is shown. Suitably, this structure may be formed from five layers as follows: non-woven, fibrous layer 34, functional particulate-loaded, non-woven, fibrous layer 35, functional particulate-loaded, non-woven, fibrous layer 36, microfiber layer 37, and non-woven, fibrous layer 38, beneficially bonded together at the respective interfaces of the web surfaces.

Particulate-loaded layers 35,36 contain particulate 40 and are generally otherwise as described in FIG. 1. Thus, particulate matter 40 is entrapped within the interstices of the matrix structure and fused to individual fibers 41. Suitably, additional protective layer 34 and support layer 38 are free of functional particulate matter, but are generally otherwise as described in FIG. 1.

The composite fibers of layers 34,35,36,38 may be the same or different. Layers 34,38 could be formed from non-composite fibers. Microfiber layer 37 is suitably formed from melt blown, polymeric microfiber having an average diameter of about 1 to 2 microns. Interfacial bonding results from intermingling of fibers from opposing layers and application of heat or pressure, or both, to form a unitary structure. Fibrous layers 34,38 beneficially respectively prevent undesired removal of immobilized functional particulate by abrasion, and provide structural support for microfiber layer 37.

Figure 3:
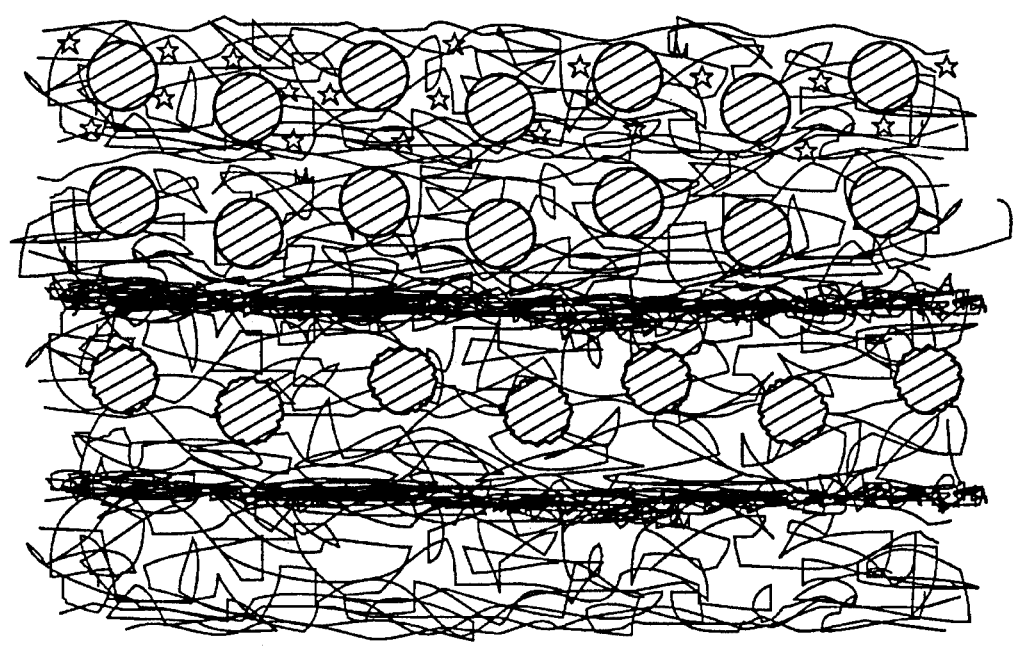
FIG. 3 is a sectional view depicting another layered fibrous structure in accordance with the invention, which includes non-woven webs having different functional particulate matter immobilized within, and microfiber webs in contact therewith.

Referring to FIG. 3, a fibrous structure 42 in accordance with the present invention, is shown. Suitably, this structure may be formed from seven layers as follows: non-woven, fibrous layer 43, functional particulate-loaded, non-woven, fibrous layer 44, functional particulate-loaded, non-woven, fibrous layer 45, microfiber layer 46, functional particulate-loaded, non-woven, fibrous layer 47, microfiber layer 48, and non-woven, fibrous layer 49, beneficially bonded together at the respective interfaces of the web surfaces.

Particulate-loaded layers 44,45 contain particulate 50 and are generally otherwise as described in FIG. 1, except that layer 44 also includes smaller size, functional particulate 52. Advantageously, particulate matter 50 is entrapped within the interstices of the matrix structure of layer 44, and thereafter smaller size, particulate matter 52 is added to and entrapped within the resultant web structure. Generally uniform distribution and high structural integrity provide for high loading of the matrix structure with particulate matter. Functional particulates 50 and 52 could provide for chemical reaction with one another under appropriate conditions.

Particulate-loaded layer 47 contains a different particulate 54, but is generally otherwise as described in FIG. 1. The functional particulate of layers 44,45,47 is advantageously fusion bonded to individual fibers 56.

Suitably, fibrous layers 43,49 are free of functional particulate matter, but are generally otherwise as described in FIG. 1. The composite fibers of layers 43,44,45,47,49 may be the same or different. Layers 43,49 could be formed from non-composite fibers.

Microfiber layers 46,48 are suitably formed from melt blown, polymeric microfiber having an average diameter of about 1 to 2 microns. Layers 46,48 could be formed from different types of microfibers, that is, one layer could for instance, be polymeric fiber and the other layer could be a functional fiber such as vapor-sorptive, carbon fiber; and thus each microfiber layer could serve a different function. Interfacial bonding results from intermingling of fibers from opposing layers and application of heat or pressure, or both, to form a unitary structure.

A fibrous structure in accordance with the invention, may have in contact therewith one or more fabric layers. These fabric layers may be exterior to or disposed within the fibrous structure of the present invention. These fabric layers may be nonwovens including partially densified nonwovens, woven fabrics, knit fabrics, porous membranes and so forth. These fabric layers may be laminated to or otherwise suitably attached to the fibrous structure. These fabric layers may exert a useful function such as water repellency and so forth.

Figure 4:
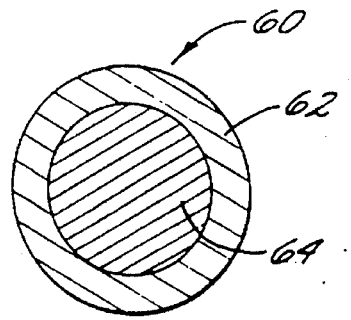
FIG. 4 is a cross-sectional view through a composite fiber useful in forming the fibrous structure of FIG. 1.

With reference to FIG. 4, an exemplary composite fiber 60 is shown. Fiber 60 is illustrative of the many types of composite fibers that may be used in the webs of FIGS. 1 to 3. Composite fiber 60 is a concentric sheath-core fiber in which a sheath 62 and a core 64 each comprise about 50% of the cross-sectional area of the fiber. The sheath is lower melting than the core. The sheath advantageously constitutes from about 40 to 60% of the weight of the fiber. As a result, strong thermal bonding without adversely affecting the strength and integrity of the core, is provided. In a highly preferred embodiment, a sheath polymer with a sharp melting point may be a nylon that completely liquefies at a temperature in the range of from about 175° to about 185° C., and the core may be a significantly higher melting polyester having a melting point of from about 240° to 256° C.

Figure 5:
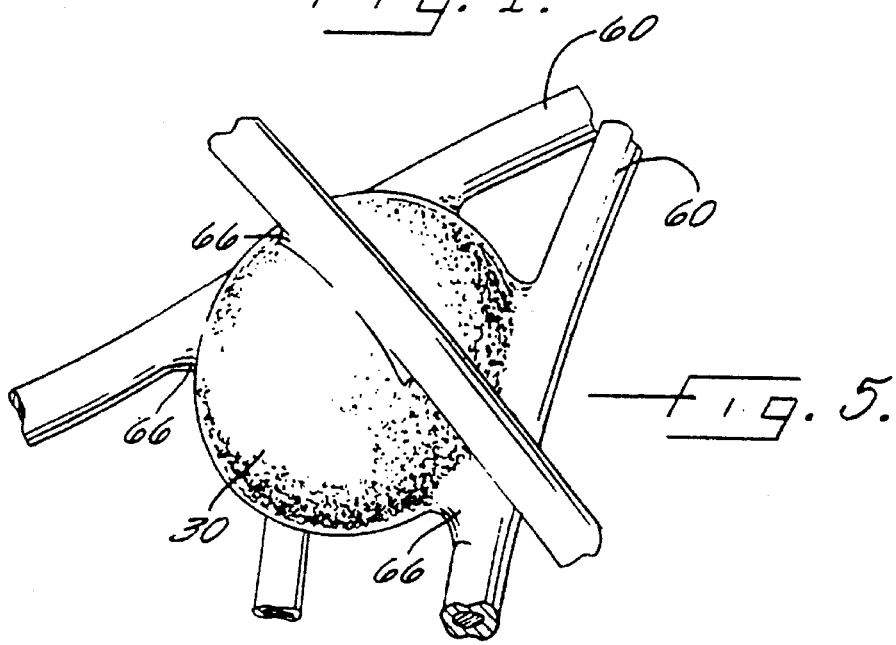
FIG. 5 illustrates a functional particle entrapped within and fusion bonded to structural matrix fibers of FIG. 1.

Referring to FIG. 5, a single functional particle 30 is shown entrapped within a plurality of fibers 60. The fibers 60 are beneficially fused to the particle at numerous points 66. Fusion of the particle to the fiber is localized in that the low melting component of a composite fiber does not form a film over the particle or otherwise substantially reduce the surface area of the particle available for contact with a liquid or gas stream moving through the fibrous structure. Thus, the particles are secured without deleteriously reducing the surface area of the particles.

Figure 6:
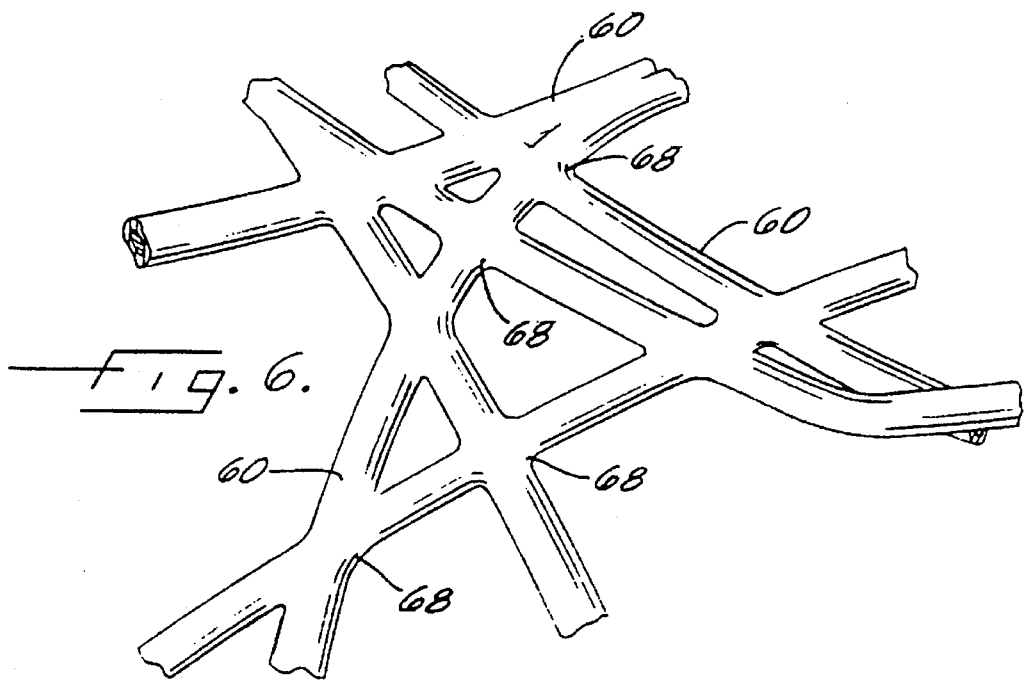
FIG. 6 depicts a portion of the thermally bonded, structural matrix of FIG. 1.
Figure 1:
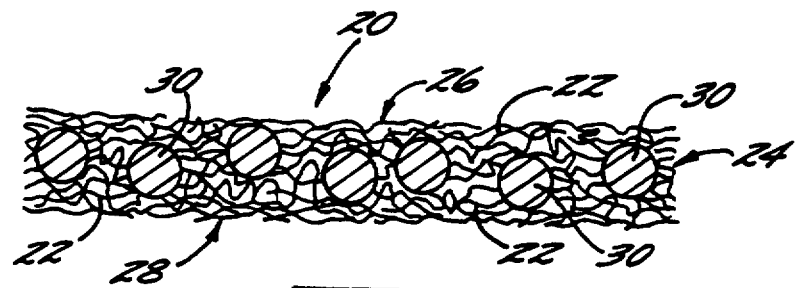
Figure 2:
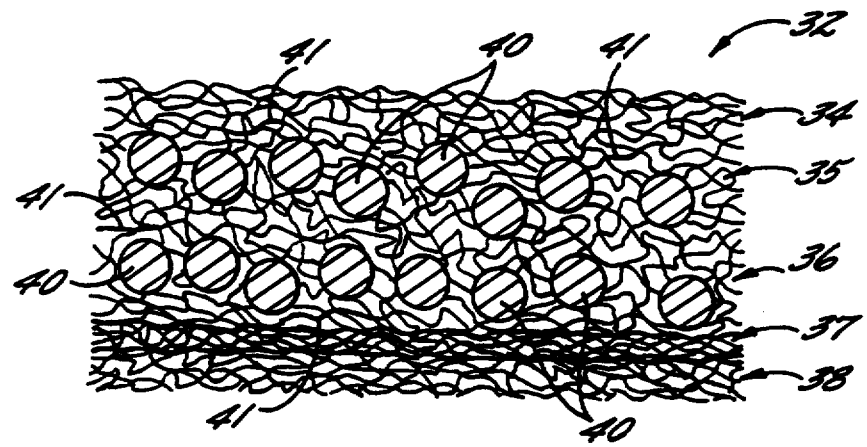
Figure 3:
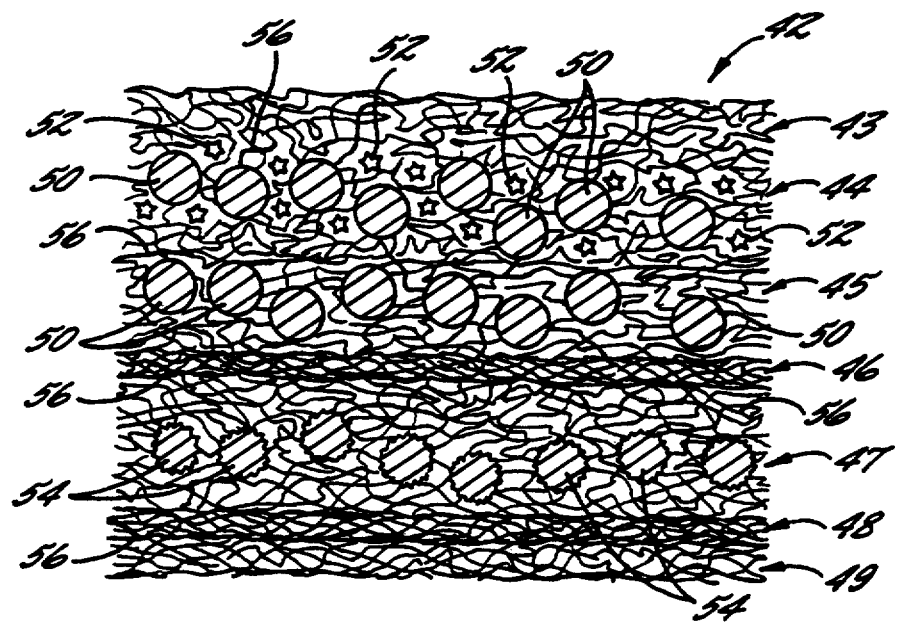

With reference to FIG. 6, a thermally bonded web in accordance with the present invention is shown, with fusion at cross over points 68. The resulting bonds are generally stronger than the composite fibers themselves. As can be seen, the thermally bonded web forms a cage-like structure in which particulate matter may be entrapped and substantially precluded from loss from the web.

Numerous end use applications exist for the fibrous structure in filter media technology. Uses include cabin air filters suitable for automobiles, trucks, other vehicles, airplanes, submarines and so forth. Uses exist in heating, ventilation and air conditioning, and in residential air purifiers, clean room pharmaceutical processing, food processing, smoking lounges, funeral homes and so forth. Uses exist in office equipment, casket liners, bandages, packaging and protective wrapping. Military, civil defense and police uses exist, including chemical and underground bunkers. Environmental uses include emissions control, chemical waste clean-up, recycled solvents, incineration, sewage plants and sterilization equipment. Uses include liquid filtration for preparing high purity water, and for color or byproduct removal in producing whisky, vinegar and so forth.

End use applications also exist for the fibrous structure in adsorptive media technology. The media may be used in various forms including pleated, tubes, pockets (as in pocket filters), blankets, rolls, bags, ducts and ductliners. The fibrous structure may be used singly or in combination with other fabrics, filter media, films, plastics and membranes.

A fibrous structure in accordance with the present invention, is beneficially dry formed. Dry forming is advantageous in forming a generally uniform structure, compared to a web structure formed from blown or melt blown fiber. Accordingly, by "generally uniform" is meant for purposes of this invention, a structure of greater uniformity than a randomly collected web formed from blown or melt blown fiber. In addition, a melt blown, collected web would have significantly higher pressure drop and would therefore be generally undesirable for use as the fiber matrix of the present invention.

Moreover, dry forming advantageously provides for controlled introduction, spacing and immobilization of dissimilar matter such as functional particulate, with tortuous paths in the particulate-loaded structure for air or fluid flow. Less beneficial for achieving the foregoing results but useful for other purposes, are wet forming and spun bonding.

In a beneficial dry forming process for making the fibrous structure of FIG. 2, a carding machine cards crimped, composite fiber and forms a non-woven web 38 on an endless moving belt. Then non-woven, microfiber web 37 is deposited onto web 38. Web 37 may be applied from a roll or formed on web 38. Thereafter, additional crimped, composite fiber is carded and a non-woven web 36 is formed on microfiber web 37.

Functional particulate matter is applied to web 36 from, for instance, a shaker. Web 36 is open to an appropriate degree and the particulate matter is of appropriate size and weight to become entrapped in the interior of web 36. Also affecting distribution and entrapment of the particulate matter is the denier of the fibers of web 36. The particulate matter may be heated or cold. An inclined ramp may be used, and concentration of the particulate within the web may be controlled by adjusting the angle of the supporting ramp.

Thereafter, additional crimped, composite fiber is carded to form a non-woven web 35 onto particulate-loaded web 36. Functional particulate matter is applied to and entrapped by web 35. Addition of the particulate in more than one layer typically improves uniformity of distribution. Subsequently, additional crimped, composite fiber is carded, and a non-woven web 34 is formed therefrom on particulate-loaded web 35. If desired, webs 34,38 may be preformed.

Then, heat in the form of IR heat, is advantageously applied to the entire structure to provide for melt bonding of the composite fiber matrices and fusion of particulate to matrix structure. Formation of a unitary structure is also advantageously accomplished. Other types of heat may be used.

Thermal bonding is carried out at a sufficient elevated temperature less than the melting point of the structural fiber component and for a suitable period of time to melt the heat-bondable component and provide adequate flow for the heat-bondable component to act as an adhesive for bonding. The thermal bonding temperature may vary, with an appropriate elevated temperature depending upon the relative melting points of the composite fiber components and the heat balance of the entire structure. Heat balance depends in part upon the functional particulate selected. Selection of a relatively higher thermal bonding temperature generally requires a relatively shorter exposure time, whereas selection of a relatively lower temperature usually requires a relatively longer exposure time. Treatment conditions that result in too much flow of the heat-bondable component or in structural degradation are to be avoided. The structure is thereafter cooled to below the resolidification or softening temperature of the heat-bondable component to form bonds.

Thermal bonding provides a self-bonded, fibrous structure with functional particulate locked into the structure. As a result of this dry forming process, the structure is generally uniform, and functional particulate matter may be spaced and fusion bonded in three dimensions to form tortuous paths for air or fluid flow through the fiber matrix. If desired, the structure may be passed through a calendar nip for further unification and controlled compaction for the desired pressure drop. As will be understood, relatively more compaction increases pressure drop, and so forth.

The present invention may be carried out with various modifications without departing from the spirit or essential attributes thereof, and accordingly, reference should be made to the appended claims, rather than to the foregoing specification as indicating the scope of the invention.

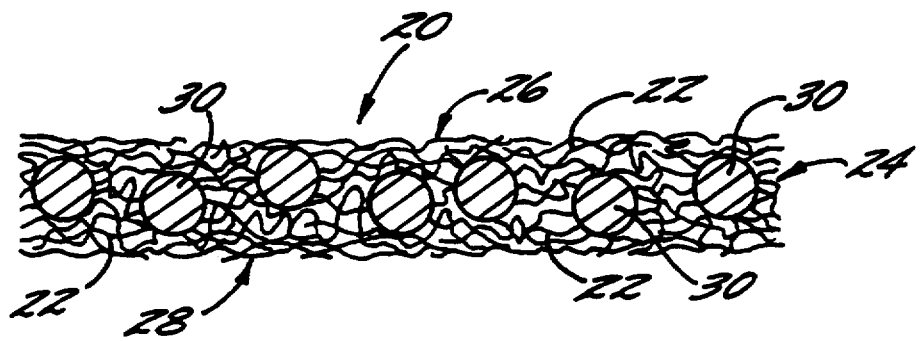

We claim:

1. A fibrous structure comprising a macrofiber matrix formed from composite fiber comprising a structural component, and a lower melting polyamide that melts at a temperature of less than 220° C., and comprising immobilized functional particulate thermally bonded to said macrofiber matrix by said polyamide.

2. The fibrous structure of claim 1, wherein said macrofiber matrix is generally uniform and includes at least 75 wt. % of said functional particulate.

3. The fibrous structure of claim 1, wherein said functional particulate is activated carbon.

4. The fibrous structure of claim 1, wherein said composite fiber is core-sheath fiber comprising a polyamide sheath.

5. A fibrous structure comprising a thermally bonded, macrofiber matrix formed from crimped composite fiber comprising a structural component and a lower melting component, said matrix being generally uniform in structure and said matrix comprising at least 50 wt. % of said functional particulate, which is generally uniformly distributed and spaced in three dimensions and thermally bonded in said matrix to form tortuous flow paths, said functional particulate being thermally bonded to said macrofiber matrix.

6. The fibrous structure of claim 5, wherein said macrofiber matrix includes from about 75 to 90 wt. % of said functional particulate.

7. The fibrous structure of claim 5, wherein said macrofiber matrix includes at least 80 wt. % of said functional particulate.

8. The fibrous structure of claim 5, wherein said lower melting component has a melting range of less than 20° C.

9. The fibrous structure of claim 6, wherein said lower melting component is a polyamide.

10. The fibrous structure of claim 5, wherein said functional particulate is activated carbon.

11. A fibrous structure comprising a thermally bonded, nonwoven web formed from composite fibers, and immobilized particulate entrapped within spaces of the web and thermally bonded to said fibers, said fibers comprising a structural component and a lower melting nylon sheath that melts at a temperature of from about 175° to 185° C. for the thermal bonding of said particulate to said fibers.

12. The fibrous structure of claim 11, wherein said particulate has a particle size of about 400 to 500 microns.

* * * * *

UNITED STATES PATENT AND TRADEMARK OFFICE
CERTIFICATE OF CORRECTION

| | | |
|---|---|---|
| PATENT NO. : | 5,486,410 | |
| DATED : | January 23, 1996 | |
| INVENTOR(S) : | Groeger et al. | |

It is certified that error appears in the above-identified patent and that said Letters Patent is hereby corrected as shown below:

On the Title Page, Item [63] "Related U.S. Application Data" should read --Continuation-in-part of Ser. No. 977,995, Nov. 18, 1992, abandoned.--

In the drawing, Figs. 1, 2 and 3 should be as shown on the attached sheet.

The illustrative Figure should appear as shown on per attached sheet.

Signed and Sealed this

Eighteenth Day of March, 1997

Attest:

BRUCE LEHMAN

Attesting Officer

Commissioner of Patents and Trademarks

United States Patent [19]

Groeger et al.

[11] Patent Number: 5,486,410
[45] Date of Patent: Jan. 23, 1996

[54] FIBROUS STRUCTURES CONTAINING IMMOBILIZED PARTICULATE MATTER

[75] Inventors: H. Gunter Groeger; George A. Serad; Clinton D. Felton, all of Charlotte, N.C.

[73] Assignee: Hoechst Celanese Corporation, Somerville, N.J.

[21] Appl. No.: 245,103

[22] Filed: May 17, 1994

Related U.S. Application Data

[63] Continuation of Ser. No. 977,995, Nov. 18, 1992, abandoned.

[51] Int. Cl.$^6$ .................................................. B32B 5/16
[52] U.S. Cl. ..................... 428/283; 428/296; 428/297; 428/408; 428/331
[58] Field of Search .......................... 428/198, 331, 428/323, 283, 296, 297, 903, 408, 320, 372, 373, 374

[56] References Cited

U.S. PATENT DOCUMENTS

| | | | |
|---|---|---|---|
| 3,971,373 | 7/1976 | Braun | 428/328 |
| 3,998,988 | 12/1976 | Shimomai et al. | 428/400 |
| 4,429,001 | 1/1984 | Kolpin | 428/383 |
| 4,554,198 | 11/1985 | von Blucher et al. | 428/143 |
| 4,565,727 | 1/1986 | Giglia et al. | |
| 4,681,801 | 7/1987 | Eian et al. | |
| 4,795,668 | 1/1989 | Krueger et al. | |
| 4,868,032 | 9/1989 | Eian et al. | |
| 4,872,220 | 10/1989 | Haruvy et al. | 2/243 |
| 4,904,343 | 2/1990 | Giglia et al. | 162/145 |
| 4,950,541 | 8/1990 | Tabor et al. | 428/373 |
| 4,966,809 | 10/1990 | Tanaka et al. | 428/323 |
| 4,970,111 | 11/1990 | Smith, Jr. | 428/283 |
| 5,077,116 | 12/1991 | Lefkowitz | 428/141 |
| 5,082,720 | 1/1992 | Hayes | 428/224 |
| 5,328,758 | 7/1994 | Markell et al. | 428/903 |

FOREIGN PATENT DOCUMENTS

| | | |
|---|---|---|
| 275047 | 7/1988 | European Pat. Off. |
| 5131136 | 5/1993 | Japan. |

*Primary Examiner*—N. Edwards
*Attorney, Agent, or Firm*—Philip P. McCann

[57] ABSTRACT

A fibrous structure comprising a composite fiber matrix loaded with immobilized functional particulate and including void spaces forming tortuous flow paths, is provided. The particulate is beneficially distributed in the interior of the fibrous structure in three dimensions and fused to a low melting component of the composite fibers without substantially reducing the available surface area of the particulate. A filtration structure of a composite staple having a nylon sheath and a polyester core, with activated carbon particles bonded to the fiber matrix, and including a microfiber web located within the structure, is specifically disclosed.

12 Claims, 2 Drawing Sheets